D. J. CABLE.
PIPE THREAD PROTECTOR.
APPLICATION FILED NOV. 12, 1909.

1,000,374.

Patented Aug. 15, 1911.

WITNESSES:
John T. Schrott
Charles H. Wagner

INVENTOR
Daniel J. Cable
BY
Fred G. Dieterich
ATTORNEYS

UNITED STATES PATENT OFFICE.

DANIEL J. CABLE, OF PITTSBURG, PENNSYLVANIA, ASSIGNOR TO FRICK & LINDSAY COMPANY, OF PITTSBURG, PENNSYLVANIA, A CORPORATION OF NEW JERSEY.

PIPE-THREAD PROTECTOR.

1,000,374.

Specification of Letters Patent. Patented Aug. 15, 1911.

Application filed November 12, 1909. Serial No. 527,733.

*To all whom it may concern:*

Be it known that I, DANIEL J. CABLE, residing at Pittsburg, in the county of Allegheny and State of Pennsylvania, have invented a new and Improved Pipe-Thread Protector, of which the following is a specification.

This invention has for its object to provide a new and improved means for protecting the threaded ends of pipes, and it is in the nature of a protector formed of sheet metal adapted to be bent and clamped over and screwed into the pipe threads, and in such manner as to prevent injury to the threads in handling or shipping the pipe.

In its generic nature, my invention embodies a sheet metal blank so formed whereby it may be readily bent around the threaded pipe end or applied in such manner that it may be screwed along the threaded ends and to cover all of the threads, it having provision for interlocking the ends to hold the protector securely in position after it is once placed over the threaded pipe end.

Figure 1:
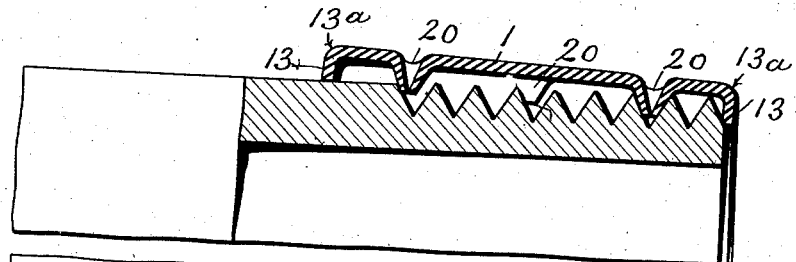
Figure 1:
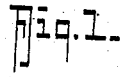
Figure 2:
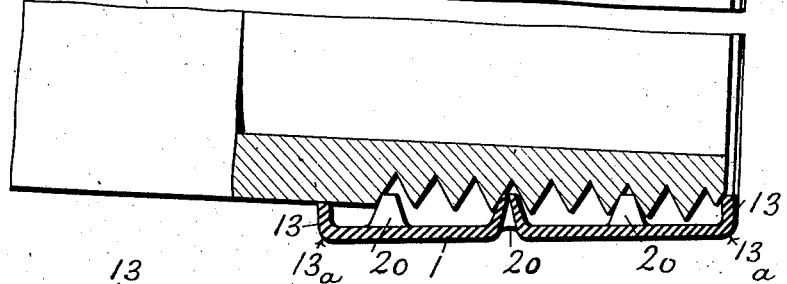
Figure 2:
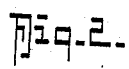
Figure 3:
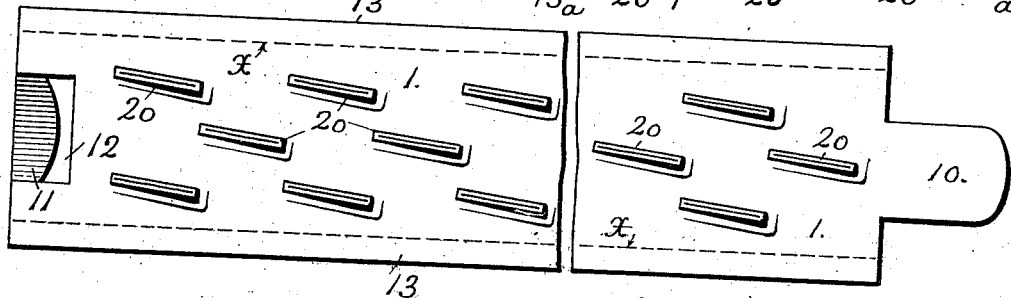
Figure 3:
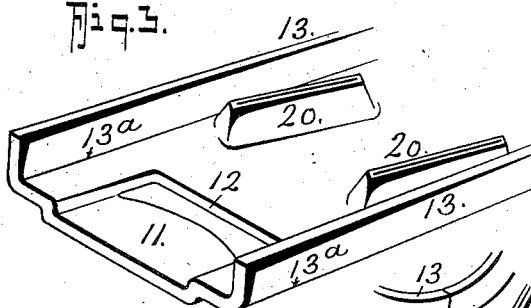
Figure 3:
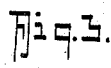
Figure 4:
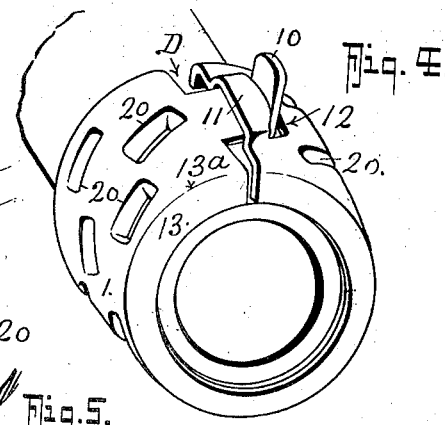
Figure 6:
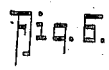
Figure 5:
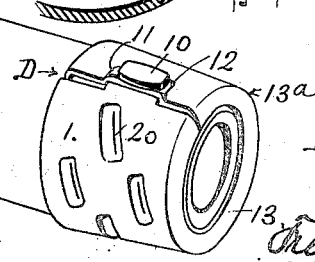

In its more subordinate features, my invention consists of certain details of construction and peculiar combination of parts, that will hereinafter be fully explained, specifically pointed out in the appended claims and illustrated in the accompanying drawing, in which:

Figure 1, is a longitudinal section, partly in elevation, of the threaded end of a pipe section with my protector applied. Fig. 2, is a plan view of the blank, which, when bent up forms my improved protector. Fig. 3, is a detail perspective view of one end of the blank. Fig. 4, is a perspective view of my invention, as applied to the end of a pipe section and prior to being clamped in place. Fig. 5, is a detail view of the interlocking ends of the protector. Fig. 6, is a view of a pipe section with my protecting device clamped over the threaded end thereof.

In the practical construction, my protecting device is formed by bending a sheet metal blank of special formation to the desired shape. The blank, the shape of which is best shown by Fig. 2, is in the nature of a sheet metal band 1 of a required length, one end of which has a longitudinally extended tang 10 for coöperating with a slot 12 transversely positioned in the other end of the blank, whose inner edge is straight while its outer edge is curved, it having a convexed shape with respect to the adjacent end of the band.

At the slot portion the blank is stamped with a longitudinal depression to form a seat 11 located in a plane beyond the outer face of the protector band, whereby to provide a positive guide way for inserting the tang 10 through the slot 12 (see Fig. 4).

In the manufacture of the protector, the opposite edges of the blank 1 are bent up on the dotted lines $x$, to form flanges 13—13, the purpose of which will presently appear. In the manufacture of my improved device the bands that are bent up to form the protectors are made of different lengths to suit the diameters of the different sizes of pipe ends, and in each special size the band is drawn up to produce a sleeve whose least inner diameter is slightly less than the smooth outside diameter of the pipe on which it is to be applied.

To provide for an exact fitting of the protector on the threaded pipe ends, the blank is stamped with a series of internally projected members or teeth 20 and these are of a greater depth than the side flanges and they are preferably arranged in a spiral direction, so they will readily follow the threads of the pipe when the protector is bent around it, and still remain in contact with the pipe threads even when the protector spreads a little in the manner clearly shown in Fig. 4.

The several teeth 20 are substantially V-shaped in cross section and their pitch is such that they easily start and ride in pipe threads, and it should be here stated, that the object in forming the thread engaging portions of the protector in the nature of a series of spirally arranged punched projections instead of making the pipe thread engaging portions as a continuous flange or thread, is that the latter arrangement I have found as impracticable, since, should the threaded end of the pipe receive a heavy blow it would mash the threads just the same as though the said threads were bare.

The flanges 13—13, before referred to, form a double function, since the flange 13 at one end, the front end, of the protector rides up out of the last inner thread on the pipe and crowds upon the smooth part of the pipe, and since this part of the pipe is of the largest diameter, it follows that the inner edge of the band spreads as in Fig. 4, it being also obvious that when forced home, the tang end of the band can be quickly inserted through part 11 and up through the slotway 12. The outer flange 13 forms a stop for engaging the end of the pipe when the protector is screwed home, as best shown in Fig. 1. The flanges 13—13 add considerable stiffness to the protecting band and renders the same, as it were, a blow resisting armor.

By reason of the peculiar construction of the band, it will be apparent, by referring more particularly to Fig. 1 that after the band is bent around the pipe end and the ends partly interlocked, as shown in Fig. 4, the protector as it is screwed home, has its front flange 13 practically kept out of riding in the pipe threads as the teeth 20 are of greater depth than the flanges 13 and when screwed home, the inner flange 13 rides upon the smooth surface which is the largest diameter of the pipe and which spreads the band ends, such spreading being rendered possible by reason of the curved bearing edge of the slot to be engaged by the tang 10. To further permit of the separating of the band ends when the protector is forced home, the tang 12 is projected from the band at a point nearer one edge than the other, see Fig. 2, which allows the tang to freely creep in the slot when driving the protector home. After the protector is threaded onto the pipe to its limit, the tang 10 is bent down as in Fig. 5, and the protector is then tightly bound upon the pipe end.

In Fig. 5 is shown how the tang 10 fits the seat 11, so as to present a smooth internal diameter for the band excepting the members 20 so that no obstruction for engaging the pipe threads other than the members 20 appears.

The construction of my protector is such that it can be economically made, is easily applied on the pipe end and once applied is firmly held in a condition that makes it convenient and practicable for handling and shipping the pipe without danger of injury to the threaded ends thereof and without danger of the threads catching in small obstructions that may come into contact with the pipe ends.

While I have referred to the bent over portions 13 as flanges, I do not mean that the flanges are necessarily at right angles to the body of the protector, as they may be simply bent portions and not flanges in the sense that that term sometimes implies.

Having thus described my invention, what I claim and desire to secure by Letters Patent is,

1. As a new article, a protecting band for the threaded ends of pipes formed of sheet metal whose opposite sides are curved inwardly to form angle flanges, one end of said band having a tang-like extension, the other end of said band having a longitudinally depressed seat, and a transverse slot adjacent to said seat into which said tang-like extension is projected, one edge of the slot which the tang-like extension engages being convexed, the body portion of said band having a series of inwardly and spirally arranged projections, substantially as shown and described.

2. As a new article, a protecting band for the threaded ends of pipes formed of sheet metal, one end of said band having a tang-like extension, the other end of said band having a longitudinally depressed seat, and a transverse slot adjacent to said seat into which said tang-like extension is projected, one edge of the slot which the tang-like extension engages being convexed, the body of said band having a series of inwardly arranged projections, substantially as shown and described.

3. As a new article, a pipe thread protector, consisting of a band of sheet metal, the ends of which are adapted to abut one another, one of said ends having a tang-like extension, the other end having a depressed seat to receive said tang-like extension and having a slot through which said tang-like extension is projected, said band having a series of inwardly arranged projections.

4. As a new article, a pipe thread protector, consisting of a band of sheet metal, one of whose ends has a tang-like extension the other end having a depressed seat to receive said tang-like extension, and having a slot through which said tang-like extension is projected, said band having a series of inwardly arranged projections, one side of said band being bent over to engage the non-threaded part of the pipe when the protector is in place, the body of said protector band being of greater diameter than the external diameter of the pipe when the ends abut, whereby the inwardly arranged projections and the bent over side of the band only will engage the pipe.

5. As a new article, a pipe thread protector, consisting of a band of sheet metal, one of whose ends has a tang-like extension, the other end having a depressed seat to receive said tang-like extension, and having a slot through which said tang-like extension is projected, said band having a series of inwardly arranged projections, one side of said band being bent over to engage the non-threaded part of the pipe when the protector is in place, the body of said protector band being of greater diameter than the external diameter of the pipe when the ends abut, whereby the inwardly arranged projections and the bent over side of the band only will engage the pipe, said band having its other side bent over to form a stop flange that rests against the end of the pipe when the protector is in place.

6. A pipe thread protector that consists of a strip of sheet metal bent into a ring-like form, said strip having provisions for securing the ends together, the internal diameter of said band being greater than the external diameter of the pipe on which it is to be fitted when the ends abut, and said band having a series of inwardly arranged thread engaging projections.

7. A pipe thread protector that consists of a strip of sheet metal bent into a ring-like form, said strip having provision for securing the ends together, the internal diameter of said band being substantially greater than the external diameter of the pipe on which it is to be fitted, and said band having a series of inwardly arranged thread engaging projections, the inner end of said band being bent over to leave a reduced aperture at said inner end and contact the non-threaded part of the pipe when the protector is in place.

8. A pipe thread protector that consists of a strip of sheet metal bent into a ring-like form, said strip having provisions for securing the ends together, the internal diameter of said band being substantially greater than the external diameter of the pipe on which it is to be fitted, said band having a series of inwardly arranged thread engaging projections, the inner edge of said band being bent over to leave a reduced aperture at said side and contact the non-threaded part of the pipe when the protector is in place, said band having its other side bent over to form a stop flange to rest against the end of the pipe when the protector is in place.

9. A pipe thread protector, comprising a flexible metal band adapted to be bent to a ring shape, provisions attached thereto for engaging the securing on to the pipe thread, means for connecting the ends of the band that allows the inner edge of the ring to spread with respect to the pipe end as the said ring is screwed upon the pipe.

10. A thread protector comprising a flexible band adapted to be bent to a ring shape and having an articulated connection at the ends, provisions attached to the ring for engaging and screwing into the pipe threads and for causing the inner edge of the ring to spread as it is being screwed on.

11. A pipe thread protector form of a band of flexible metal, the inner end of said band being turned inwardly, projections on the inner face of said band adapted to engage the threads of the pipe, one of the ends of said band having a tang-like extension, and the other end of said band having a slot with a convex edge adapted to receive said tang-like extension.

12. A pipe thread protector comprising a band of flexible material the inner edge of said band being turned inwardly to engage the non-threaded part of the pipe when the protector is in place, one of the ends of said band having a tang-like extension, the other end having a slot through which said tang-like extension is projected, said slot having a convex edge, and a series of inwardly arranged projections on said band, the body of said protector band being of greater diameter than the external diameter of the pipe, whereby the inwardly arranged projections and the inwardly turned portion along one edge of the band only will engage the pipe.

DANIEL J. CABLE.

Witnesses:
 GEO. S. TINDLE,
 JOHN T. GLASS.